United States Patent [19]

Kondo et al.

[11] 4,319,507
[45] Mar. 16, 1982

[54] SHEARING DEVICE

[75] Inventors: Takajiro Kondo, Yasugi; Toshitaka Asamoto, Matsue, both of Japan

[73] Assignee: Hitachi Metals, Ltd., Tokyo, Japan

[21] Appl. No.: 138,382

[22] Filed: Apr. 8, 1980

Related U.S. Application Data

[63] Continuation-in-part of Ser. No. 879,582, Feb. 13, 1978, abandoned, which is a continuation of Ser. No. 508,628, Sep. 23, 1974, abandoned.

[30] Foreign Application Priority Data

Sep. 26, 1973 [JP] Japan .................. 48-111486

[51] Int. Cl.³ .................. B23D 35/00; B26D 7/26
[52] U.S. Cl. .................. 83/694; 83/698
[58] Field of Search ............. 83/674, 673, 675, 694, 83/701, 698, 345, 349; 76/101 A, 101 C, 101 R; 407/118

[56] References Cited

U.S. PATENT DOCUMENTS

| | | | |
|---|---|---|---|
| 160,330 | 3/1875 | Jones | 83/694 |
| 947,100 | 1/1910 | Fuller | 83/674 X |
| 1,529,971 | 3/1925 | Vance | 83/698 X |
| 1,861,456 | 6/1932 | Shaw et al. | 83/669 |
| 3,025,727 | 3/1962 | Smith | 76/107 C |
| 3,170,342 | 2/1965 | Downie | 76/107 C |
| 3,212,365 | 10/1965 | Hardy | 76/107 C |
| 3,374,700 | 3/1968 | Mages | 83/698 X |
| 3,514,828 | 6/1970 | Wale | 407/118 X |
| 3,528,465 | 9/1970 | Omley | 407/118 X |
| 3,650,171 | 3/1972 | Reed | 83/349 X |
| 3,751,176 | 8/1973 | Von Hollen | 407/118 X |
| 3,822,625 | 7/1974 | Obenshain | 83/349 X |
| 4,034,451 | 7/1977 | Kummer | 407/118 X |
| 4,036,095 | 7/1977 | Huber et al. | 83/674 |

Primary Examiner—Frank T. Yost
Attorney, Agent, or Firm—Craig and Antonelli

[57] ABSTRACT

A shearing device comprising a tool body or holder and a shearing edge member having at least one end with a rectangular cross section. A groove or cut-away portion having a rectangular cross section, in which the shearing edge member is fitted, is defined in the tool body. The shearing edge member is bonded or soldered to the walls of the groove at a relatively low temperature, being fitted therein.

3 Claims, 5 Drawing Figures

SHEARING DEVICE

CROSS REFERENCE TO THE RELATED APPLICATIONS

This is a continuation-in-part of our parent application Ser. No. 879,582 filed on Feb. 13, 1978, and now abandoned which is a continuation of application Ser. No. 508,628 filed on Sept. 23, 1974, now abandoned.

BACKGROUND OF THE INVENTION

1. Field of the Invention

This invention relates to a shearing device for use in shearing a sheet material such as a metal sheet or plate, paper or cloth, wherein a material for a shearing device such as cemented carbide or high-hardness hardened steel is rigidly anchored in the tool body. To maintain constant the clearance between an upper and lower shearing edge members along the lengths thereof, the shearing edge member of the respective shearing tool should be finished straight at high precision, from the view points of the desired functions of a shearing device.

2. Description of the Prior Art

A shearing device of the type of the prior art has been such that, as shown in FIG. 1, a material for shearing edge member 12 is soldered to a tool body 11 with a hard solder. The soldering with a hard solder suffers from a drawback that, when soldering, heat at more than 500° C. is applied to the tool body 11 and shearing edge member 12, so that there results a strain in the shearing device thus prepared due to the difference in coefficient of thermal expansion and phase transformation between the material of the tool body 11 and the material of the shearing edge member 12, or there result adhesion of scales to the shearing device. To remove a strain from the shearing device to provide a highly precise and straight tool, many man hours are required for a machining process.

In case a piece of S45C of 10 mm×40 mm (JIS carbon steel for construction) is used as a tool body, a piece of SKH 9 of 3 mm×15 mm (JIS high speed tool steel) is used as a material for shearing edge member, and both are joined with silver brazing alloy of a melting point of 700° C., then there is produced a shearing device with a curvature S of 0.2 to 0.5 mm or thereabout per 100 mm in length, as shown in FIG. 2.

In case cemented alloy is used as a material for the shearing edge member, the difference in coefficient of thermal expansion between the cemented alloy and the material of the tool body becomes more evident, so that a curvature of the device, resulting from the soldering of these materials, becomes greater. In case tungsten carbide (WC) is used as a material for a shearing edge member which is hard-soldered to the tool body under the same condition as in the above case, a resultant curvature of 1 to 1.5 mm per 100 mm in length results. This is due to the fact that the coefficient of thermal expansion of steel is $10-12\times10^{-6}/°C.$ and in contrast thereto, that of tungsten carbide is $5-8\times10^{-6}/°C.$ which is half the value of steel. It is a requisite for a shearing device that a curvature in the device be normally maintained below 0.01 mm. For this reason, a shearing device having a curvature of more than that value need be repeatedly subjected to the finishing process, in which a straightening process by means of a press or hammer and a grinding process are carried out alternately, so that a straight shearing device may be provided. Such a finishing process generally entails many steps, particularly the straightening process requiring an extreme skill.

In case soft solder is used for joining the shearing edge member 12 to the tool body 11, strain as well as scales is greatly reduced in amounts, because of the use of relatively low heating temperature, as compared with those used in the hard soldering. However, the joints produced by soft soldering suffer from a drawback that the tool body 11 and the shearing edge member 12 are apt to be separated from each other during its service. Such a shearing device is not adapted for actual use, unless the construction of a shearing device is modified.

The silver solder (hard solder) whose melting point is about 700° C. presents a tensile strength of 40 to 60 Kg/mm$^2$, while soft solder whose melting point is about 300° C. presents a tensile strength of 5 to 15 Kg/mm$^2$, which is too low to satisfy a required strength.

It is accordingly an object of the present invention to provide a shearing device, in which soft solder or a metallic bonding agent of a synthetic resin group is used for bonding the shearing edge member to the tool body, thus producing a shearing device sufficiently strong in tensile strength and free from strain or formation and adhesion of scales to the tool due to bonding.

SUMMARY OF THE INVENTION

According to the present invention, there is provided a shearing device comprising a groove provided in a tool body for receiving therein a shearing edge member, and the shearing edge member being fitted and bonded to the groove, rigidly, by the use of soft soldering or by the use of a metallic bonding agent of a synthetic resin group.

DETAILED DESCRIPTION OF THE INVENTION

Figure 1:
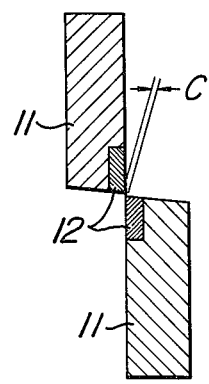
FIG. 1 is a cross-sectional view of a shearing device of a prior art.
Figure 2:
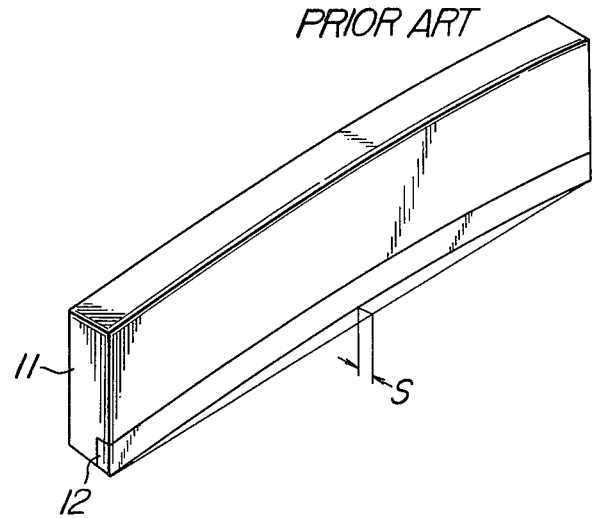
FIG. 2 is a perspective view of a shearing device, showing formation of strain in the tool due to the bonding.
Figure 3:
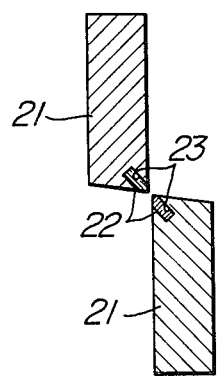
FIG. 3 is a cross-sectional view of a shearing device according to the present invention.
Figure 4:
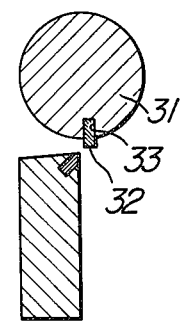
FIG. 4 is a cross-sectional view of a rotary type shearing device according to the present invention; and, FIG. 5 is a perspective view showing separation of a shearing edge member from a tool body due to an external force.

Description will be given to embodiments of the present invention with reference to the accompanying drawings. Referring to FIG. 3, a material for a shearing edge member 22 such as cemented alloy or high hardness hardened steel is fitted in a groove 23 provided in a tool body 21 and rigidly bonded in the body 21 by soft soldering or by the use of a metallic bonding agent of a synthetic resin group such as a bonding agent of an epoxy resin group or phenol group. In case the soft soldering is employed, a heating temperature is below 400° C., while in case a metallic bonding agent of a synthetic resin group is used for bonding, a heating temperature is below 200° C. FIG. 4 shows a construction of a rotary type shearing device, in which a shearing edge member 32 is fitted in a groove 33 provided in a columnar tool body 31 and rigidly bonded in the body 31 integrally therewith by using soft soldering or a metallic bonding agent of a synthetic resin group.

Figure 5:
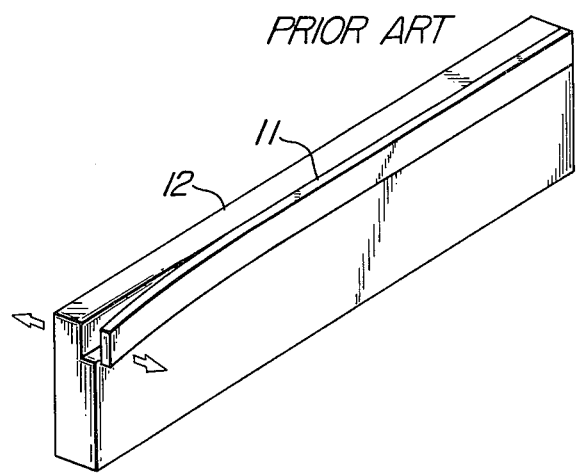

As shown in FIGS. 3 and 4, the groove 23, 33 provided in the tool body 21, 31 has a rectangular cross section, and the shearing edge member 22, 32 is fitted in the groove. At least the end of the shearing edge member fitted in the groove also has a rectangular cross section. By the structure of the rectangular cross section, the shearing edge member presents bonding surfaces to the tool body which cover the entire side-wall and bottom surfaces of a groove provided in the tool body, so that a bonding area of the shearing edge member to the tool body is increased to twice as much as that of the conventional shearing device, with the result of the improved bonding strength. The shearing device of prior art presents the lowest strength when an external force is applied thereto in the direction of separating the shearing edge member from the tool body as shown in FIG. 5.

The clearance between the shearing edge member and the groove is formed and the bonding agent is filled in the clearance. Thus, the shearing edge member is fitted in the groove of the tool body. In the case of large clearance the layer of the bonding agent becomes thick, and in the case of small clearance it becomes thin.

The present invention makes the clearance small as much as possible and makes the bonding agent layer thin. Where the shearing device is used to cut a sheet web, the length of the tool body is between 150 mm and 350 mm and the thickness of the shearing edge member is between 1.0 mm and 2.0 mm. Thus, the width of the groove is made larger than that of the shearing edge member by about 0.1 mm. In this case the clearance is about 0.1 mm, and the thickness of the bonding agent layer in about 0.05 mm as a result of such small clearance. The bond strength of the shearing edge member is increased by forming such thin bonding agent layer. The clearance should be made within the size of 0.2 mm. As the layer is made thinner, the bond strength increases for a given bonding agent. For example;

| | EPOXY BONDING AGENT |
|---|---|
| THICKNESS (mm) | SHEARING STRESS IN TENSION (Kg/cm$^2$) |
| 0.1 | 260 |
| 1 | 180 |
| 2 | 140 |
| 3 | 110 |

Further, it is hard to rip off the shearing edge member from the tool body in accordance with the present invention even if the shearing edge member is pressed by external force. This is so because the shearing edge member and the groove having the rectangular cross section are held to each other through the bonding agent layer which is interposed between the side-wall and bottom surfaces of the shearing edge member and both inner surfaces of the groove. Thus, with the shearing device of the present invention, since the material for shearing edge is rigidly fitted in the groove in the tool body, when an external force acts on the shearing device in any direction, the groove serves to receive the external force on a wall which is compressed thereby, so that there is no risk of separation of the shearing edge member from the tool body. In the present invention, the joining of the material of shearing edge member to the tool body is effected at a temperature of less than 400° C. in the case of the soft soldering, and at a temperature of less than 200° C. or room temperature in the case of the use of a metallic bonding agent of a synthetic resin group, with less or no possibility of creation of strain due to bonding as well as without a risk of formation of scales.

Consequently, the number of machining process is greatly reduced, as compared with that in conventional shearing device, without entailing a skill for tool straightening work.

According to the present invention, a shearing device of high precision and simple in construction is produced with ease by rigidly bonding or soldering a shearing edge member in a groove provided in a tool body by the use of a soft soldering or metallic bonding agent of a synthetic resin group.

What is claimed is:

1. In a shearing device having a pair of long narrow shearing tools for cutting a sheet web, at least one of the tools comprising:

a tool body with a coefficient of thermal expansion being provided with a groove arranged at an outer surface of the tool body, the groove having a rectangular cross section;

a shearing edge member, with a coefficient of thermal expansion different from that of the tool body, having at least one end with a rectangular cross section which is fitted with clearance in the groove such that the shearing edge member presents bonding surfaces to the tool body which cover the entire sidewall and bottom surfaces of the groove, the clearance of the thickness of the shearing edge member to the groove width being between 0.1 and 0.2 mm; and a thin layer of a relatively low temperature bonding agent being provided in the clearance for rigidly bonding the shearing edge member in the groove.

2. The shearing device as set forth in claim 1, wherein the bonding agent is a metallic bonding agent of a synthetic resin.

3. The shearing device as set forth in claim 1, wherein the clearance is about 0.1 mm.

* * * * *